United States Patent

[11] 3,633,595

[72] Inventor Hiroaki Nagamatsu
 Hiroshima-shi, Japan
[21] Appl. No. 870,030
[22] Filed Oct. 28, 1969
[45] Patented Jan. 11, 1972
[73] Assignee Toyo Kogyo Co., Ltd.
 Hiroshima, Japan
[32] Priority Oct. 31, 1968
[33] Japan
[31] 43/95250

[54] HYDRAULIC GOVERNOR
 3 Claims, 4 Drawing Figs.
[52] U.S. Cl................................................. 137/56
[51] Int. Cl.............................................. G05d 13/30
[50] Field of Search........................................ 137/53, 54, 56

[56] References Cited
UNITED STATES PATENTS

| | | | |
|---|---|---|---|
| 2,876,784 | 3/1959 | Adams .................... | 137/56 |
| 2,911,987 | 11/1959 | Wayman .................. | 137/56 X |
| 3,049,028 | 8/1962 | English et al. ............. | 137/56 X |

Primary Examiner—Robert G. Nilson
Attorney—Sughrue, Rothwell, Mion, Zinn & Macpeak ABSTRACT: A hydraulic governor having a rotary shaft, a valve body fixed to the rotary shaft and having a cylinder formed therein, a valve piston slidably inserted in the cylinder, a governor weight disposed in the cylinder in such a manner that the governor weight is urged against the centrifugal force of the weight by a spring and is urged into contact with the valve piston to provide a simple and improved governor.

INVENTOR
HIROAKI NAGAMATSU

HYDRAULIC GOVERNOR

BACKGROUND OF THE INVENTION

1. Field of the Invention

This invention relates generally to a hydraulic governor for converting centrifugal forces acting on a governor weight and valve piston into an oil pressure or a governor pressure, in rotation with a rotary shaft, and more particularly to an improvement in a hydraulic governor adapted to control the hydraulic pressure of an automatic transmission of an automobile.

2. Description of the Prior Art

An automatic transmission for automobiles generally comprises shift valves for shifting a plurality of power trains, and wherein said shift valves are operated by a governor pressure proportional to the rotational speed of a driven shaft, or the vehicle speed and a throttle pressure proportional to the torque generated in the engine in order to be on or off in accordance with the variations of the vehicle speed and the torque generated in the engine, whereby a shifting of the power train is carried out in response to the variations of these pressures. For this reason, a governor pressure regulated by the hydraulic governor is preferable in order to change sensitively in all ranges of rotation of the driven shaft, in which the shifting operation of the power trains is carried out.

However, because this type of hydraulic governor for the automatic transmission transfers the centrifugal force raised by the rotation of the driven shaft into a hydraulic pressure or governor pressure, and moreover transfers the line pressure into a governor pressure proportional to the centrifugal force, the governor pressure characteristics are such that the varying amplitude of the governor pressure in the low-speed range is smaller than that in the high-speed range and that its maximum value is limited by the amplitude of the line pressure. Accordingly, if the varying rate of the governor pressure in all ranges is made larger in order that the varying amplitude of the governor pressure in the low-speed range be relatively larger, the governor pressure becomes the line pressure which is the maximum value of the governor pressure before it reaches the maximum shiftable rotating speed with the result that the transmission cannot be shifted by the shaft valve by means of the governor pressure in the neighborhood of high vehicle speeds. On the other hand, if the varying rate of the governor pressure is small so that the governor pressure is able to vary within the range of maximum shiftable rotating speed, the varying amplitude of the governor pressure in the low-speed ranges becomes quite small with the result that the shift valve is difficult to be controlled accurately at predetermined speeds by the governor pressure in the low-speed range.

Previously, a plurality of governors having different governor pressure characteristics were combined so as to improve the aforementioned disadvantages of the conventional hydraulic governor, which structure is expensive due to the complicity of the mechanism.

SUMMARY OF THE INVENTION

This invention contemplates the elimination of the aforementioned disadvantages of the conventional hydraulic governor and provides a new and improved hydraulic governor wherein the governor pressure has a large varying amplitude in the low-speed range and is able to vary within the high-speed rotating range of the rotary shaft, by urging a governor weight in the direction against the centrifugal force thereof and in a direction to contact a valve piston.

BRIEF DESCRIPTION OF THE DRAWINGS

The other features and advantages of the present invention will become apparent from the following description taken in conjunction with the accompanying drawings, in which.

DETAILED DESCRIPTION OF THE PREFERRED EMBODIMENT

Figure 2:
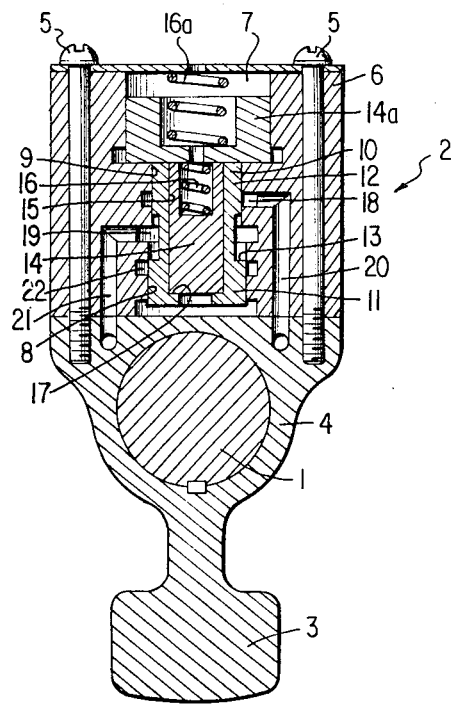
FIG. 2 is a sectional view similar to FIG. 1, but showing another embodiment thereof.
Figure 1:
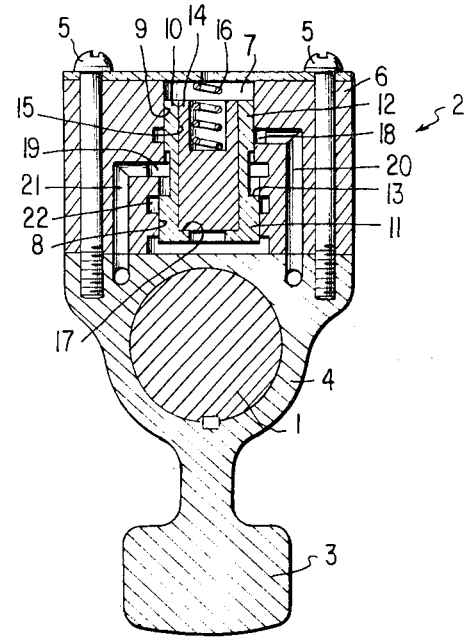
FIG. 1 is a sectional view of one embodiment of the hydraulic governor constructed in accordance with the present invention.

Reference is now made to the drawings, and particularly to FIGS. 1 and 2, which show embodiments of the present invention. The hydraulic governor comprises a rotary shaft 1, a valve body 2 secured to the rotary shaft 1 having a supporting member or flange 4 integrally formed with a balance weight 3 thereon and a supported member or integral part 6 fixed to the flange 4 by bolts 5. A cylinder 7 is provided in the integral part 6 having a large diameter portion 8 and a small diameter portion 9. A valve piston 10 is slidably inserted into the cylinder 7 and has lands 11 and 12 corresponding to the large diameter portion 8 and the small diameter portion 9 of the cylinder 7 respectively. The land 11 has a pressure-receiving surface 13 for pushing the valve piston 10 inwardly by the operation of the oil pressure. A governor weight 14 is slidably inserted into a hole 15 of the valve piston 10 and urged by a spring 16 toward the rotating center thereof, the inner end of said governor weight 14 is urged by the spring 16 on the step 17 of the valve piston 10 when in a stationary state. Annular oil passage ports 18 and 19 are provided in the cylinder 7 and communicate with the line pressure passage 20 and governor pressure passage 21, respectively. An annular exhaust port 22 is also provided in the cylinder 7.

In operation of the hydraulic governor thus described, where the line pressure is supplied through the line pressure oil passage 20 to the oil passage port 18, if the valve body 2 is rotated together with the rotary shaft 1, the governor weight 14 and valve piston 10 are urged outwardly by the centrifugal force operating on themselves.

Figure 3:
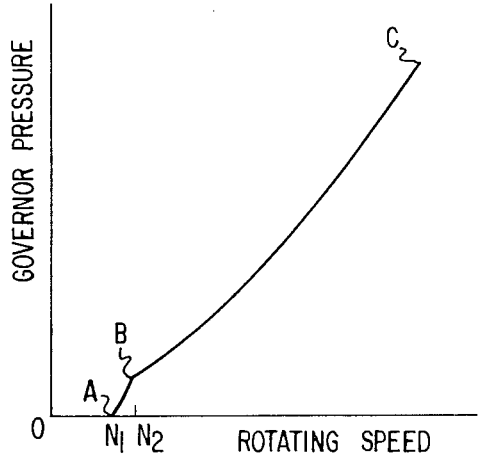
FIG. 3 is a graph showing a governor pressure characteristic of the governor shown in FIG. 1.

If the rotating speed of the rotary shaft 1 is within the range between zero and $N_1$ shown in the diagram of FIG. 3, the composite force of the centrifugal forces acting on the governor weight 14 and valve piston 10 is not enough to slide the valve piston 10 outwardly against the tension of the spring 16 so as to connect the oil passage port 18 with the oil passage port 19 with the result that the governor pressure is not generated.

From such an operating state, if the rotating speed of the rotary shaft 1 is over $N_1$ so that the composite force of the centrifugal forces acting on the governor weight 14 and valve piston 10 exceeds the tension of the spring 16, the valve piston 10 and governor weight 14 are engaged by the step 17 to slide integrally outwardly to connect the oil passage port 18 with the oil passage port 19. For this reason, part of the line pressure supplied from the oil passage port 18 is held along the line A–B in FIG. 3 as a governor pressure and is supplied to the governor pressure oil passage 21 through the oil passage port 19 by the balance between the force pushing the valve piston 10 inwardly by the oil pressure acting on the pressure receiving surface 13 of the land 11 and the spring 16 and the force pushing the valve piston 10 outwardly by the composite force of the centrifugal force acting on the valve piston 10 and governor weight 14.

In such an operating state, if the rotating speed of the rotary shaft 1 reaches $N_2$, the amount of displacement of the governor weight 14 becomes larger than the amount of the displacement of the valve piston 10 in the upward direction so that the governor weight 14 is separated from the step 17 of the valve piston 10 with the result that the centrifugal force operating the governor weight 14 and the tension of the spring 16 do not have any effect on the valve piston 10. Thus, the governor pressure for rotating speeds over $N_2$ of the rotary shaft 1 is held to a small varying rate as shown by the comparison of line A–B with line B–C in FIG. 3 which results from the balance between the force pushing the valve piston 10 outwardly by the centrifugal force acting on the valve piston 10 and the force which pushes inwardly the pressure receiving surface 13 of the land 11 by the governor pressure acting thereon.

Accordingly, in the hydraulic governor of this invention the spring constant of the spring 16 and the mass of the valve piston 10 and governor weight 14 may be optionally selected such that the rising point of the governor pressure and varying amount of the governor pressure in high and low rotating speed ranges may be selected to an optimum value.

From the foregoing description it can be seen that this invention discloses that the governor weight 14 is urged in a direction against centrifugal force to contact the valve piston 10 with the result that its structure is very simple to thereby provide a less expensive governor.

Figure 4:
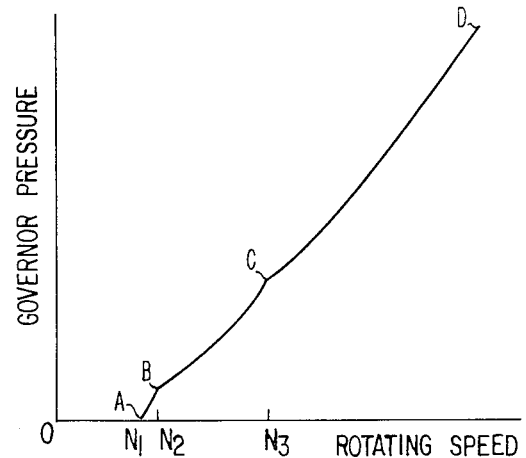
FIG. 4 is a graph similar to FIG. 3 but showing that of the governor shown in FIG. 2.

It is also understood that it is easy to increase the number of switching points of the governor pressure to a number greater than two, by increasing the number of the governor weights 14 and spring 16 as shown in FIG. 1. By adding an additional governor weight 14a and spring 16a to the governor valve assembly, as shown in FIG. 2, a third governor pressure switching point will be added and will take place at a third speed $N_3$ greater than $N_2$ as shown in FIG. 4. By adding additional governor weights 14a and a corresponding spring 16a, the slope of the line indicating the governor output pressure which commences at rotating speed $N_2$ may be changed, with the additional switching point occurring at rotating speed $N_3$, at which point the pressure characteristic slope of the line changes again, as shown in FIG. 4.

What is claimed is:

1. A hydraulic governor comprising, in combination, a valve body secured to a rotary shaft for rotation therewith a valve piston slidably disposed within a bore in said valve body for radial movement relative to said rotary shaft, said valve piston having a bore therein opening at the end of said valve piston radially outwardly from said rotary shaft, a governor weight slidably disposed within said bore in said valve piston, biasing means for biasing said governor weight radially inwardly against said valve piston, an inlet and an outlet passage formed in said valve body and communicating with said bore, said inlet passage being connected with a source of hydraulic pressure to apply a force against said valve piston to move said piston radially inwardly when said rotary shaft is rotated, said governor weight being moved radially outwardly against the force of said biasing means by centrifugal force when said rotary shaft is rotated to prevent said biasing means from applying a radially inward force against said valve piston above a predetermined speed, the position of said valve piston in said bore being determined by the balance of the radially inward directed hydraulic force acting against said valve piston and the radially outward centrifugal force acting on said valve piston when the speed of said rotary shaft exceeds said predetermined value, whereby governor pressure is supplied through said outlet passage at a first rate of change determined by the balance of the centrifugal force acting jointly on said valve piston and said governor weight and the radially inward force by said hydraulic fluid pressure when the speed of rotation of said rotary shaft is below a predetermined value.

2. A hydraulic governor as claimed in claim 1, wherein the biasing force of said biasing means is of such a value to maintain said governor weight and said valve piston at a radially inward position to block communication of said inlet conduit with said outlet conduit when the speed of rotation of said rotary shaft is below a first predetermined value, whereby no governor output pressure is supplied when the speed of rotation of said rotary shaft is below said first predetermined value.

3. A hydraulic governor as claimed in claim 1, further comprising a second governor weight positioned in a bore in said valve body radially outwardly from said first governor weight and said valve piston, and a second biasing means biasing said second governor weight radially inwardly against said first governor weight and said valve piston, said first biasing means being positioned between said first governor weight and said second governor weight, whereby the biasing force of said first biasing means is prevented from acting radially inwardly against said valve piston by the radial outward movement of said first governor weight when the speed of rotation of said rotary shaft is below a first predetermined value, and both said first and said second governor weights are moved radially outwardly against the biasing force of said second biasing means when the speed of rotation of said rotary shaft is above a second predetermined value to allow the output pressure characteristic of said governor to be changed.

* * * * *